United States Patent
Ahn et al.

(10) Patent No.: US 11,271,426 B2
(45) Date of Patent: Mar. 8, 2022

(54) CAPACITIVE COUPLER STRUCTURE AND WIRELESS POWER TRANSFER SYSTEM INCLUDING THE CAPACITIVE COUPLER STRUCTURE

(71) Applicant: KOREA ADVANCED INSTITUTE OF SCIENCE AND TECHNOLOGY, Daejeon (KR)

(72) Inventors: Seungyoung Ahn, Daejeon (KR); Chan Jun Park, Daejeon (KR); Jaehyoung Park, Daejeon (KR); Yujun Shin, Daejeon (KR); Sungryul Huh, Daejeon (KR); Bomson Lee, Gyeonggi-do (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 17/096,169

(22) Filed: Nov. 12, 2020

(65) Prior Publication Data

US 2021/0143673 A1    May 13, 2021

(30) Foreign Application Priority Data

Nov. 13, 2019  (KR) .......................... 10-2019-0144987

(51) Int. Cl.
*H02J 50/05* (2016.01)
*H02J 50/00* (2016.01)
*B64C 39/02* (2006.01)

(52) U.S. Cl.
CPC ............ *H02J 50/05* (2016.02); *H02J 50/005* (2020.01); *B64C 39/024* (2013.01); *B64C 2201/042* (2013.01)

(58) Field of Classification Search
CPC ....... H02J 50/05; H02J 50/005; B64C 39/024; B64C 2201/042
See application file for complete search history.

(56) References Cited

U.S. PATENT DOCUMENTS

| | | | |
|---|---|---|---|
| 2014/0167525 A1* | 6/2014 | Van Goor ............ | H04B 5/0037 307/104 |
| 2015/0255988 A1* | 9/2015 | Yang ....................... | H02J 50/05 307/104 |
| 2019/0140492 A1* | 5/2019 | Beyer ................... | H04B 5/0037 |

(Continued)

FOREIGN PATENT DOCUMENTS

| JP | 2014-150649 A | 8/2014 |
|---|---|---|
| JP | 2015-186294 A | 10/2015 |

(Continued)

*Primary Examiner* — Jared Fureman
*Assistant Examiner* — Joel Barnett
(74) *Attorney, Agent, or Firm* — Maier & Maier, PLLC

(57) ABSTRACT

According to one embodiment of the present disclosure, there is provided a capacitive coupler structure, including: power transmitters, each including a first metal plate and a second metal plate, and power receivers, each including a third metal plate and a fourth metal plate, where the first metal plate and the third metal plate form a first capacitor, the second metal plate and the fourth metal plate form a second capacitor, and each center of gravity of the first metal plate through the fourth metal plate is aligned on a single vertical line, and the first metal plate through the fourth metal plate form capacitive couplings.

4 Claims, 8 Drawing Sheets

(a)

(b)

(56) References Cited

U.S. PATENT DOCUMENTS

2020/0203998 A1\* 6/2020 Almudallal ............. H02J 50/70
2021/0066961 A1\* 3/2021 Mi ........................... H04B 5/00

FOREIGN PATENT DOCUMENTS

| JP | 2019-176621 A | 10/2019 |
| --- | --- | --- |
| KR | 10-16041720000 B1 | 3/2016 |
| WO | 2014/125709 A1 | 8/2014 |

\* cited by examiner

CAPACITIVE COUPLER STRUCTURE AND WIRELESS POWER TRANSFER SYSTEM INCLUDING THE CAPACITIVE COUPLER STRUCTURE

CROSS-REFERENCE TO RELATED APPLICATION

Pursuant to 35 U.S.C. § 119(a), this application claims the benefit of the earlier filing date and the right of priority to Korean Patent Application No. 10-2019-0144987, filed on Nov. 13, 2019, the contents of which is incorporated by reference herein in its entirety.

TECHNICAL FIELD

The present disclosure relates to a capacitive coupler structure and a wireless power transfer system including the capacitive coupler structure, and, more specifically, to the capacitive coupler structure and the wireless power transfer system including the capacitive coupler structure, which are available for constantly maintaining efficiency by reducing parasitic capacitances. For reference, the present disclosure is presented in a thesis regarding "Separated Circular Capacitive Coupler for Reducing Cross-Coupling Capacitance in Drone Wireless Power Transfer System" of the inventors of the present disclosure.

BACKGROUND

Nowadays, wireless charging technologies draws attention as a convenient charging solution for various applications such as electric vehicles, mobile applications, and drone applications. A wireless power transfer system can improve durability through waterproofing and dustproofing by removing electrical contact between battery chargers and electric devices, and reduce weight of the applications by miniaturizing or removing a battery. Based on the advantages of the wireless power transfer system, researches on applying a wireless charging system into the drone applications have been actively conducted.

Heretofore, studies regarding a wireless charging system adopting an inductive coupler had been actively made. However, for the inductive coupler, the use of a Litz-wire and a ferrite core can lead to the high cost and cause a rise in temperature of the wireless charging system because of eddy current losses around metallic materials.

To overcome these problems, a wireless power transfer system adopting a capacitive coupler that transfers power through the electric field rather than the magnetic field is sometimes used. However, because a previous capacitive coupler structure had metal plates parallel to each other, a mutual capacitance was decreased so that the power transfer efficiency was reduced in case of a rotational misalignment between the metal plates.

Therefore, needs for a capacitive coupler structure that is robust to the rotational misalignment arise.

SUMMARY

The present disclosure provides a capacitive coupler and a wireless power transfer system including the capacitive coupler that may solve a rotational misalignment problem of a wireless charging system and increase coupling capacitances by reducing parasitic capacitances.

According to one aspect of the present disclosure, there is provided a capacitive coupler structure comprising: power transmitters each including a first metal plate and a second metal plate and power receivers each including a third metal plate and a fourth metal plate, wherein the first metal plate and the third metal plate form a first capacitor, the second metal plate and the fourth metal plate form a second capacitor, and each center of gravity of the first metal plate through the fourth metal plate is aligned on a single vertical line, and the first metal plate through the fourth metal plate form capacitive couplings.

In the capacitive coupler structure, the first metal plate and the third metal plate may be symmetrical ring shapes facing each other, and the second metal plate and the fourth metal plate may be symmetrical disk shapes facing each other.

In the capacitive coupler structure, each inner radius of the first metal plate and the third metal plate may be larger than each radius of the second metal plate and the fourth metal plate.

According to another aspect of the present disclosure, there is provided a wireless power transfer system comprising: a power supply, an inverter, a compensation circuit, a capacitive coupler structure, a rectifier and a resistor, wherein the capacitive coupler structure includes: power transmitters each including a first metal plate and a second metal plate and power receivers each including a third metal plate and a fourth metal plate, wherein the first metal plate and the third metal plate form a first capacitor, the second metal plate and the fourth metal plate form a second capacitor, and each center of gravity of the first metal plate through the fourth metal plate is aligned on a single vertical line, and the first metal plate through the fourth metal plate form capacitive couplings.

In the wireless power transfer system, the first metal plate and the third metal plate may be symmetrical ring shapes facing each other, and the second metal plate and the fourth metal plate may be symmetrical disk shapes facing each other.

In the wireless power transfer system, each inner radius of the first metal plate and the third metal plate may be larger than each radius of the second metal plate and the fourth metal plate.

According to one embodiment of the present disclosure, the rotational misalignment problem of the wireless charging system may be solved, and the reduction of the parasitic capacitances may increase the coupling capacitances and system efficiency.

DETAILED DESCRIPTION

General terms used in the specification and claims are selected in consideration of functions in various embodiments of the present invention. However, there terms may vary depending on the intention of a technician working in the field, legal or technical interpretation, and the emergence of new technologies. Also, some terms may be terms arbitrarily selected by the applicant. These terms may be interpreted as the meanings defined in the specification, and if there is no specific term definition, they may be interpreted based on the general contents of the specification and common technical knowledge in the art.

In addition, the same reference numbers or numerals in each drawing attached to the specification indicate parts or components that perform substantially the same function. For convenience of description and understanding, different embodiments will be described using the same reference numbers or symbols. That is, even if all of the components having the same reference numerals are shown in a plurality of drawings, the plurality of drawings do not mean one embodiment.

Also, in the specification and claims, terms including ordinal numbers such as 'first' and 'second' may be used to distinguish between elements. These ordinal numbers are used to distinguish the same or similar constituent elements from each other, and the meaning of the term should not be limitedly interpreted due to the use of such ordinal numbers. For example, the order of use or arrangement of components combined with these ordinal numbers should not be limited and interpreted by the number. If necessary, each ordinal number may be used interchangeably.

In the specification, expressions in the singular include plural expressions unless the context clearly indicates otherwise. In the present application, terms such as 'comprise' or 'comprise' are intended to designate the presence of features, numbers, steps, actions, components, parts, or a combination thereof described in the specification, but one or more other It is to be understood that it does not preclude the presence or addition of features, numbers, steps, actions, components, parts, or combinations thereof.

Further, in the embodiment of the present application, when a part is connected to another part, this includes not only a direct connection but also an indirect connection through another medium. In addition, the meaning that a certain part includes a certain component means that other components may be further included rather than excluding other components unless otherwise stated.

Hereinafter, the present application will be described in more detail with reference to the accompanying drawings.

Figure 1:
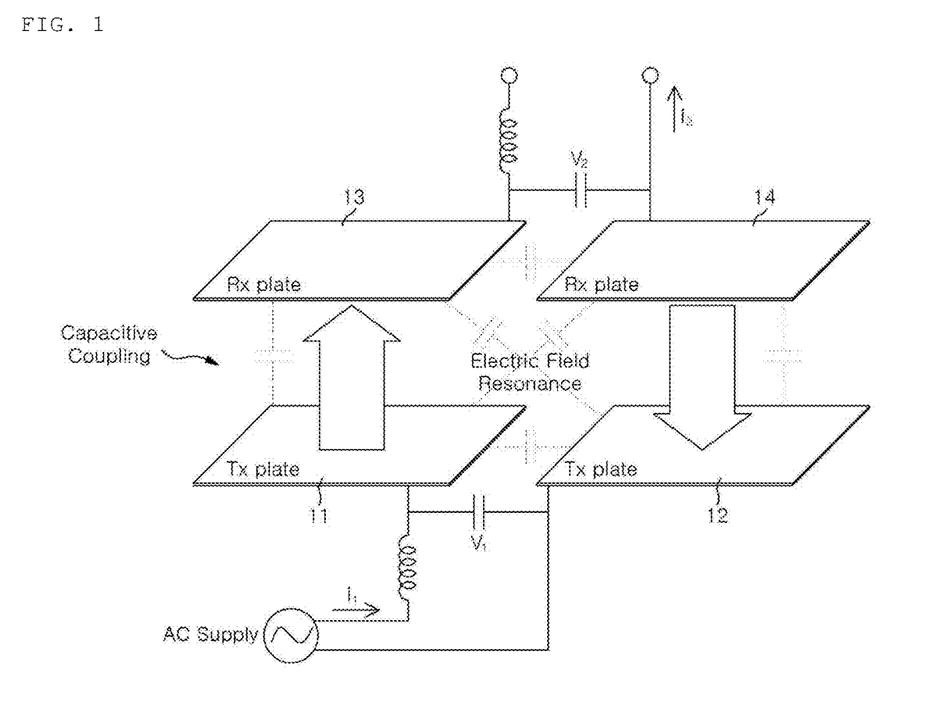
FIG. 1 shows a diagram illustrating a previous capacitive power transfer system.

FIG. 1 shows a diagram illustrating a previous capacitive power transfer system. Four metal plates 11 to 14 form capacitors transferring power. A first metal plate 11 and a second metal plate 12 operate as transmitters transferring the power, and a third metal plate 13 and a fourth metal plate 14 operate as receivers receiving the power.

As illustrated in FIG. 1, electric fields are formed between each pair of the four metal plates 11 to 14. Further, an energy balance between the four metal plates 11 to 14 is attained and thus resonance occurs. According to the formed electric fields, capacitive coupling effects occur between each pair of the four metal plates 11 to 14. It is possible to transfer power through the capacitive coupling effects.

Herein, the four metal plates 11 to 14 may be aluminum plates, etc., but are not limited to those plates.

However, in a previous capacitive coupler structure illustrated in FIG. 1, as previously described, the four metal plates 11 to 14 are parallel to each other so that if a rotational misalignment happens, it causes reduction of a mutual capacitance and thus keeps from transferring the power.

Figure 2:
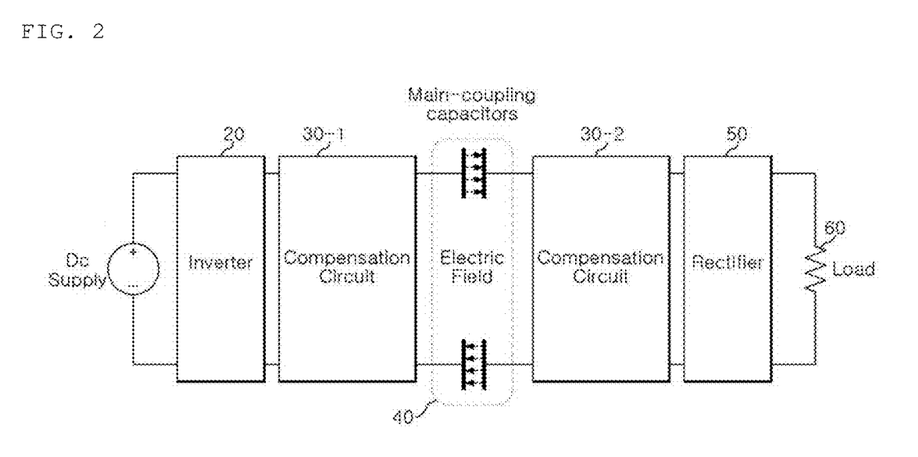
FIG. 2 shows a circuit diagram illustrating a wireless power transfer system including a capacitive coupler structure.

FIG. 2 shows a circuit diagram illustrating a wireless power transfer system including a capacitive coupler structure.

Based on the circuit diagram illustrated on FIG. 2, hereinafter, a wireless power transfer method using electric fields through capacitive couplings is described. Power is generated by an inverter 20 from DC input voltage and transmitted to a first side of main-coupling capacitors 40 through impedance matching for a resonance performed by a first compensation circuit 30-1. The power transmitted to the first side is transferred to a second side of the main-coupling capacitors 40 as an electric fields form, and the transferred power is transmitted to a rectifier 50 through impedance matching performed by a second compensation circuit 30-2. The power transmitted to the rectifier 50 is used to charge a load.

Herein, a power transfer loop is formed by the main-coupling capacitors 40, and plates of the first side operate as transmitters and plates of the second side operate as receivers.

Figure 3:
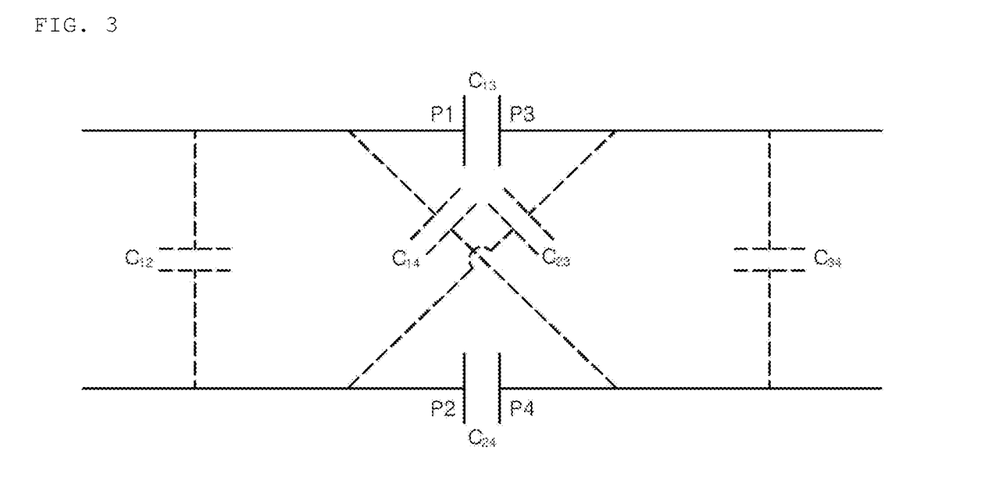
FIG. 3 shows a circuit diagram illustrating coupling capacitances between each pair of plates of a capacitive coupler structure included in a wireless power transfer system.

FIG. 3 shows a circuit diagram illustrating coupling capacitances between each pair of plates of a capacitive coupler structure included in a wireless power transfer system.

As illustrated in FIG. 3, coupling capacitances are formed between two plates: a pair of a first metal plate P1 and other pair of a third metal plate P3, and a second metal plate P2 and a fourth metal plate P4. Including the both coupling capacitances described above, total six capacitances are formed among the four plates P1 to P4.

Herein, coupling capacitances $C_{13}$ and $C_{24}$, each formed by the first metal plate P1 and the third metal plate P3, and by the second metal plate P2 and the fourth metal plate P4, are main capacitances forming a power transfer loop.

Coupling capacitances $C_{12}$ and $C_{34}$ are formed between the metal plates of a same side (transmitter plates or receiver plates) respectively, and coupling capacitances $C_{14}$ and $C_{23}$ indicate parasitic coupling capacitances formed by edge effects between the first metal plate P1 and the fourth metal plate P4, and between the second metal plate P2 and the third metal plate P3.

Figure 4:
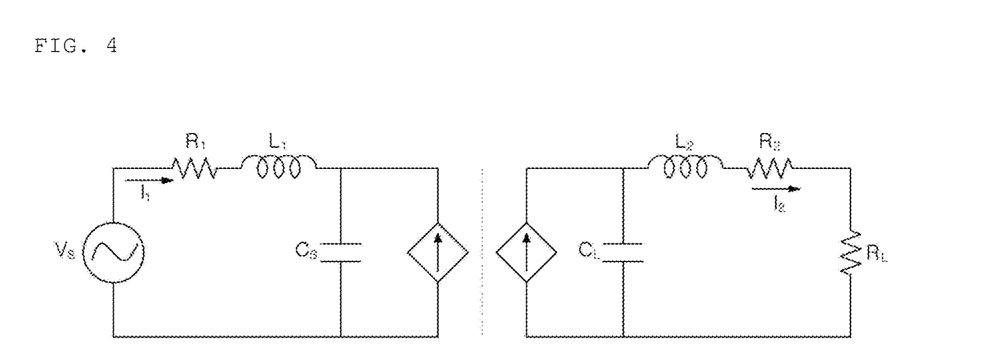
FIG. 4 shows an equivalent circuit diagram of a circuit diagram illustrated in FIG. 3.

FIG. 4 shows an equivalent circuit diagram of a circuit diagram illustrated in FIG. 2.

A mutual capacitance $C_M$ of the wireless power transfer system including a coupler structure may be expressed using main coupling capacitances and parasitic capacitances as below Equation 1.

$$C_M = \frac{C_{13}C_{24} - C_{14}C_{23}}{C_{13} + C_{14} + C_{23} + C_{24}} \quad \text{[Equation 1]}$$

Because the mutual capacitance $C_M$ described above is proportional to efficiency of the wireless power transfer system, the mutual capacitance $C_M$ is a significantly important factor to increase the efficiency of the wireless power transfer system.

Specifically, system efficiency $\eta_{LC,max}$ and a coupling coefficient $K_C$ of the wireless power transfer system using the LC compensation circuits 30-1 and 30-2 are expressed respectively as below Equation 2 and Equation 3.

$$\eta_{LC,max} = \frac{1}{1 + \frac{1}{k_c^2 Q^2} + \frac{2}{k_c Q}\sqrt{1 + \frac{1}{k_c Q}}} \quad \text{[Equation 2]}$$

$$k_c = \frac{C_M}{C_S C_L} \quad \text{[Equation 3]}$$

Herein, $C_S$ and $C_L$ indicate compensation capacitors each of an input side and an output side of the equivalent circuit of the wireless power transfer system.

Since the system efficiency $\eta_{LC,max}$ is determined by the coupling coefficient $K_C$ and a quality factor Q, the system efficiency $\eta_{LC,max}$ is proportional to the mutual capacitance $C_M$ if the quality factor Q is constant, which is caused by the fact that the metal plates have identical areas so that the main capacitances are constant.

Therefore, in the LC compensation circuit, the larger the mutual capacitance, the greater the system efficiency.

Figure 5:
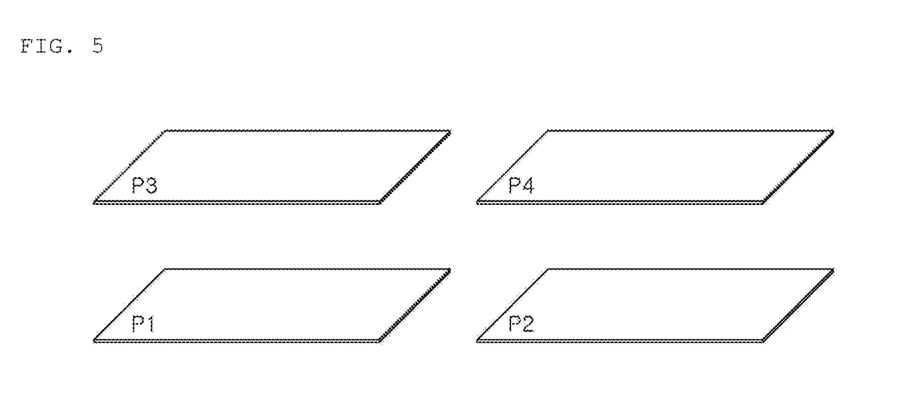
FIG. 5 shows a diagram illustrating parallel plates of a previous coupler structure.

FIG. 5 shows a diagram illustrating parallel plates of a previous coupler structure. Further, FIG. 6 shows a diagram illustrating main capacitances and parasitic capacitances of couplers according to one embodiment of the present disclosure.

As illustrated in FIG. 5, in case of a rotational misalignment, because of reduction of area directly faced between transmitter plates (P1 and P3) and receiver plates (P2 and P4), the previous coupler structure caused reduction of main capacitances and thus a mutual capacitance was reduced. Since the reduction of the mutual capacitance led to reduction of efficiency of the system, it was required for the coupler structure to maintain the mutual capacitance constantly in case of the rotational misalignment.

Figure 6:
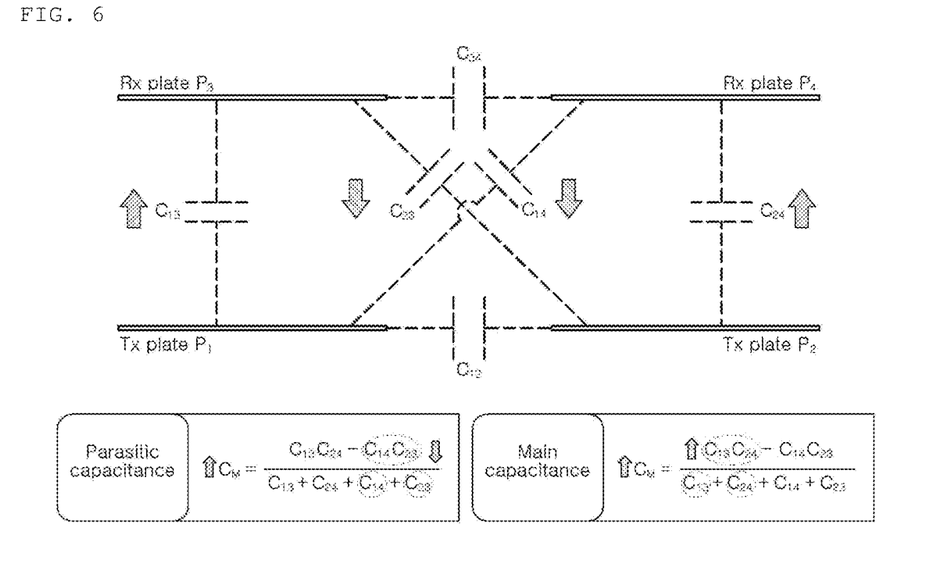
FIG. 6 shows a diagram illustrating main capacitances and parasitic capacitances of couplers according to one embodiment of the present disclosure.

To solve the problem, as illustrated in FIG. 6, reducing parasitic capacitances $C_{14}$ and $C_{23}$ by increasing distances between metal plates of each side, or increasing main capacitances $C_{13}$ and $C_{24}$ by reducing distances between metal plates forming main coupling capacitances was performed to increase the mutual capacitance.

However, because this method resulted in a problem of increasement of space occupied by the coupler structure, a method reducing parasitic capacitances in given narrow space is needed.

Figure 7:
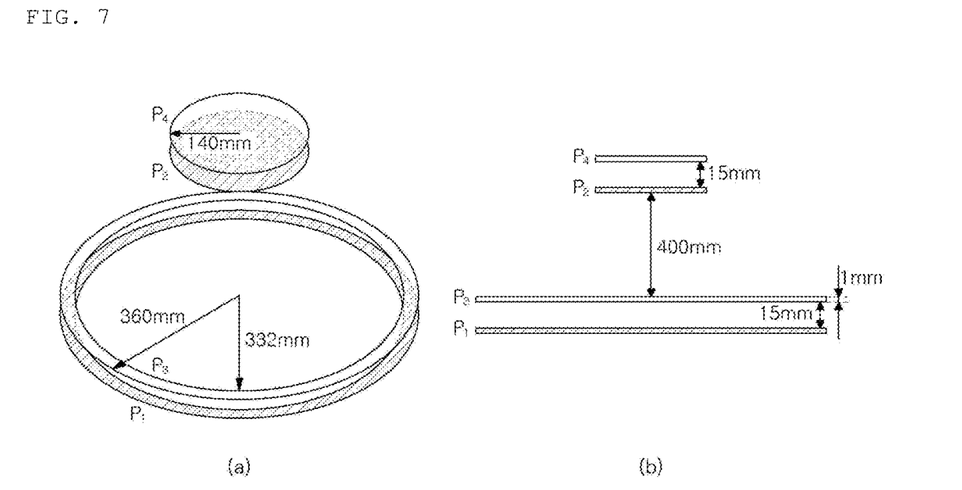
FIG. 7 shows a diagram illustrating a structure of separated circular capacitive couplers according to one embodiment of the present disclosure.

FIG. 7 shows a diagram illustrating a structure of separated circular capacitive couplers according to one embodiment of the present disclosure.

Referring to FIG. 7 (a), a first metal plate P1 and a third metal plate P3 form a first capacitor, and a second metal plate P2 and a fourth metal plate P4 form a second capacitor. Herein, each center of gravity of the four metal plates P1 to P4 is aligned on a single vertical line, and capacitive couplings are formed among the four metal plates P1 to P4.

Herein, the first metal plate P1 and the third metal plate P3 may be symmetrical ring shapes facing each other, and the second metal plate P2 and the fourth metal plate P4 may be symmetrical disk shapes facing each other. Since each center of gravity of the four metal plates P1 to P4 is aligned on the single vertical line as described above, a mutual capacitance may be constantly maintained in case of a rotational misalignment.

Herein, each inner radius of the first metal plate P1 and the third metal plate P3 may be designed to be larger than each radius of the second metal plate P2 and the fourth metal plate P4. For example, it may be designed that each inner radius and outer radius of the first metal plate P1 and the third metal plate P3 are 332 mm and 360 mm respectively, and each radius of the second metal plate P2 and the fourth metal plate P4 is 140 mm.

Further, as illustrated in FIG. 7 (b), it also may be designed that distances between the first metal plate P1 and the third metal plate P3, and between the second metal plate P2 and the fourth metal plate P4 are 15 mm, and a distance between the second metal plate P2 and the third metal plate P3 is 400 mm. Herein, each thickness of ring shapes and the disk shapes may be designed to be 1 mm.

Figure 8:
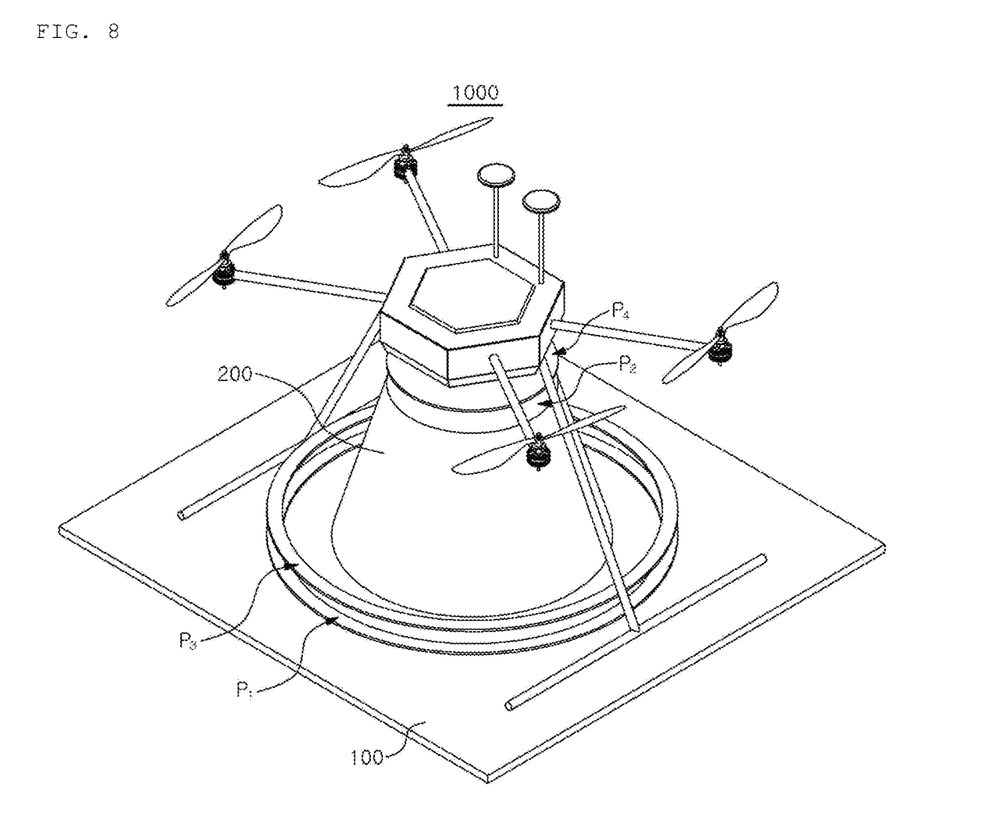
FIG. 8 shows a diagram illustrating a drone charging station and a drone adopting a capacitive coupler structure according to one embodiment of the present disclosure.

FIG. 8 shows a diagram illustrating a drone charging station 100 and a drone 200 adopting a capacitive coupler structure according to one embodiment of the present disclosure.

Figure 9:
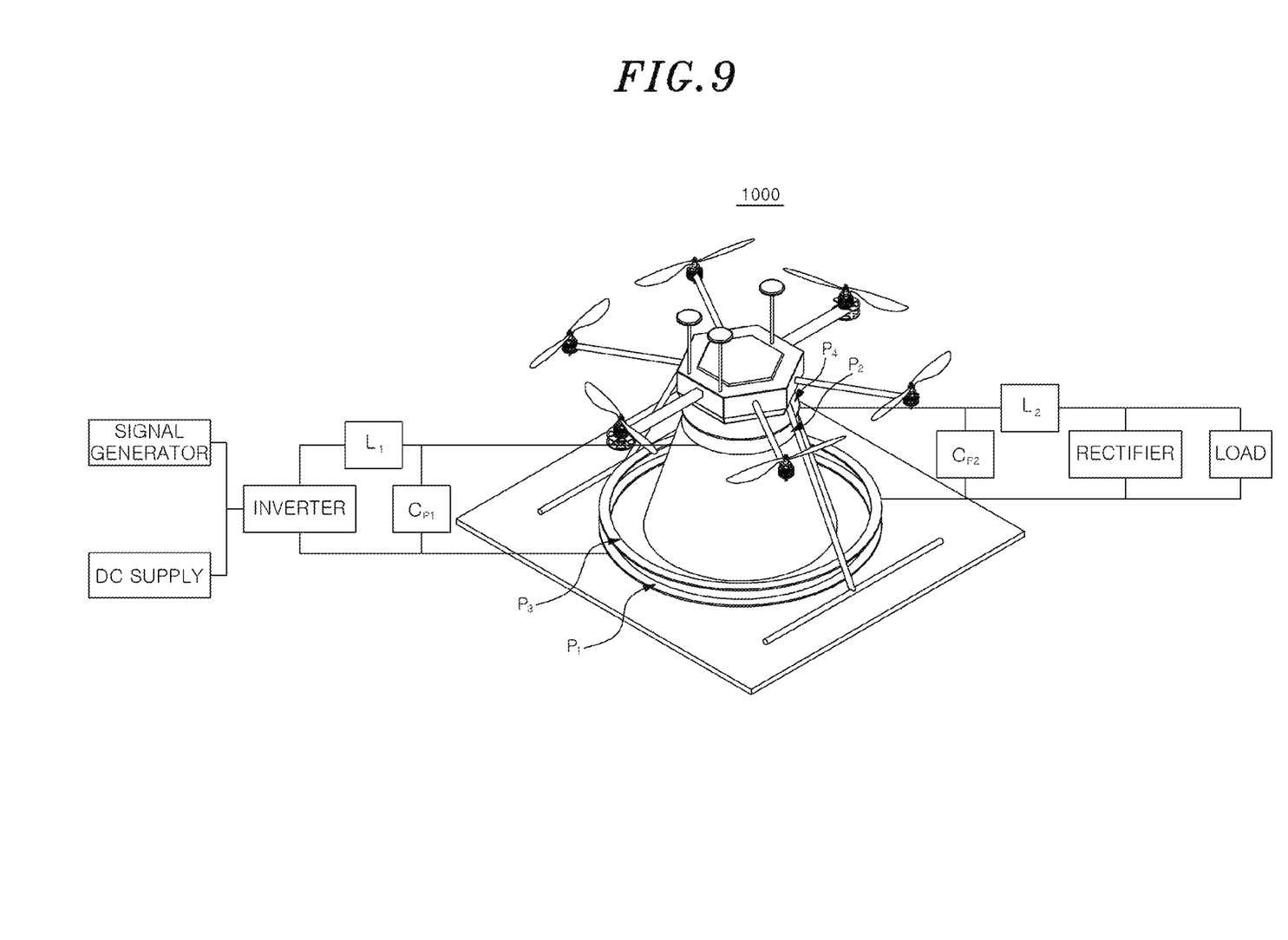
FIG. 9 shows a diagram illustrating a drone and a drone charging station according to one embodiment of the present disclosure.

FIG. 8 shows a structure of a drone charging system 1000 to which the coupler structure illustrated in FIG. 7 is applied, and a first metal plate P1 and a second metal plate P2 of transmitters are embedded in the drone charging station 100 and a third metal plate P3 and a fourth metal plate P4 of receivers may be installed in the drone 200. Using a structure of the drone charging station 100 may lead to reduction of parasitic capacitances $C_{14}$ and $C_{23}$ each caused by edge effects between the first metal plate P1 and the fourth metal plate P4, and between the second metal plate P2 and the third metal plate P3 and thus a mutual capacitance may be increased. FIG. 9 shows a diagram illustrating a drone and a drone charging station according to one embodiment of the present disclosure.

Figure 10:
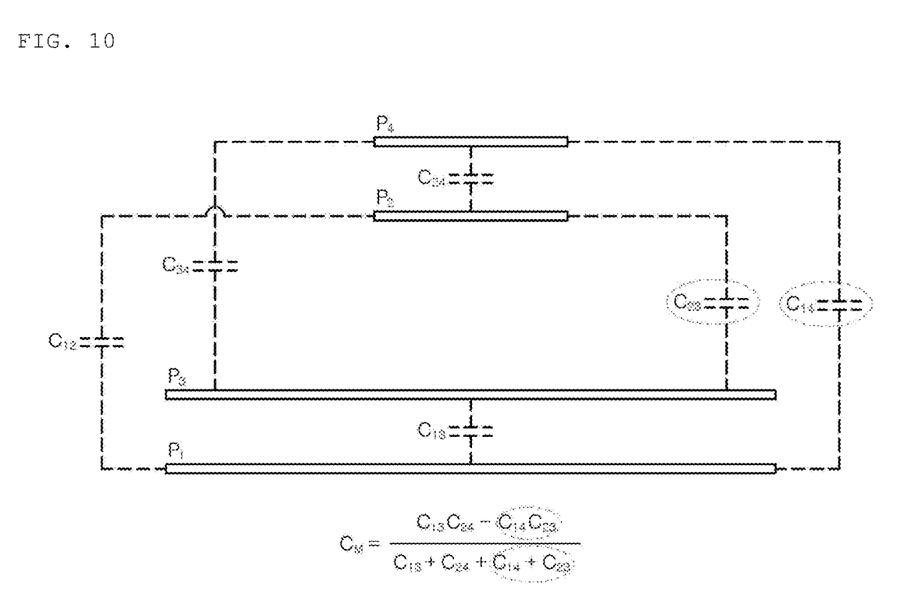
FIG. 10 shows a diagram illustrating coupling capacitances of capacitive couplers according to one embodiment of the present disclosure.

FIG. 10 shows a diagram illustrating coupling capacitances of capacitive couplers according to one embodiment of the present disclosure.

A coupler structure of the present disclosure may be briefly illustrated as FIG. 10, and, the structure of the drone charging station 100 may lead to increasing of distances between metal plates to cause reduction of parasitic capacitances $C_{14}$ and $C_{23}$, and may correspondingly increase a mutual capacitance (referring to an equation in FIG. 10.)

Figure 11:
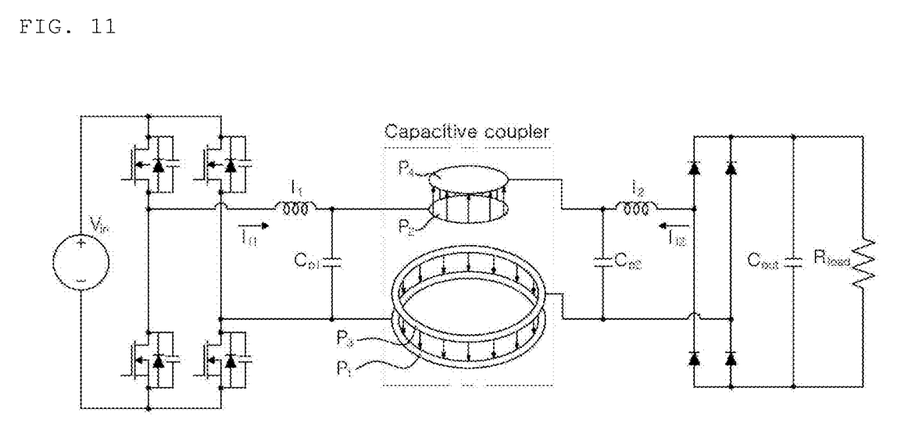
FIG. 11 shows a LC compensation circuit diagram of circular capacitive couplers according to one embodiment of the present disclosure.

FIG. 11 shows a LC compensation circuit diagram of a circular capacitive coupler to which the coupler structure according to FIG. 10 is applied.

Therefore, a suggested capacitive coupler structure of the present disclosure may improve system efficiency by increasing a mutual capacitance.

Figure 12:
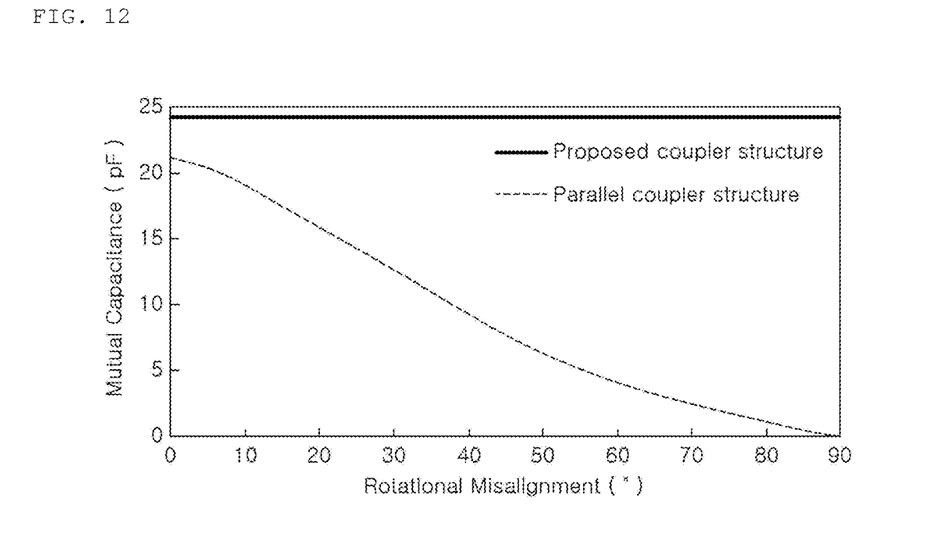
FIG. 12 shows a graph comparing mutual capacitances, in case of a rotational misalignment, between a previous parallel coupler structure and a coupler structure according to one embodiment of the present disclosure.

FIG. 12 shows a graph comparing mutual capacitances, in case of a rotational misalignment, between a previous parallel coupler structure and a coupler structure according to one embodiment of the present disclosure.

Particularly, through a simulation in case of the rotational misalignment, FIG. 12 shows a result of comparing changes of the mutual capacitances based on the rotational misalignment between the previous parallel coupler structure and the separated circular capacitive coupler structure of the present disclosure.

When comparing in terms of same areas, under the rotational misalignment condition between metal plates of transmitters and receivers, it is confirmed that the mutual capacitance is significantly decreased in the previous parallel coupler structure, however, the mutual capacitance is constantly maintained in the coupler structure of the present disclosure.

According to the result of the simulation, it is confirmed that the mutual capacitance of the previous parallel coupler structure is decreased from a maximum of 21.1 pF to 0.0005 pF at 90 degrees rotation, however, the mutual capacitance of the separated circular coupler is constantly maintained as 24.3 pF under the rotational misalignment condition.

According to the various embodiments of the present disclosure, the rotational misalignment problem of the wireless charging system may be solved by reducing the parasitic capacitances, and coupling capacitances and the system efficiency may be correspondingly increased.

As previously described, the embodiments of the present disclosure are illustrated and described, however, the present disclosure is not limited by those embodiments, and it will be easily understood that various changes and modifications may be made by those skilled in the art to which this present disclosure belongs without departing from the scope of the essential characteristics of the present disclosure as defined in the following claims, and these various changes and modifications cannot be construed separately from the technical ideas or predictions of the present disclosure.

This work was supported by Institute of Information & communications Technology Planning & Evaluation (IITP) grant funded by the Korean government (MSIT) (No. 2020-0-00839, Development of Advanced Power and Signal EMC Technologies for Hyper-connected E-Vehicle)

The national research and development project related to this application is as follows.

Project unique number: 1711116792
Project number: 2020-0-00839
Government department: Ministry of Science and ICT
R&D management Agency: Institute of Information & communications Technology Planning & Evaluation
R&D project: Broadcasting and Communication Industry Technology Development
Research Project Title: Development of Advanced Power and Signal EMC Technologies for Hyper-connected E-Vehicle
Contribution Ratio: 1/2
Managing department: Korea Advanced Institute of Science and Technology
Project period: Apr. 4, 2020-Dec. 31, 2027

What is claimed is:

1. A capacitive coupler structure comprising:
power transmitters each including a ring-shaped first metal and a disk-shaped second metal; and
power receivers each including a ring-shaped third metal and a disk-shaped fourth metal,
wherein the ring-shaped first metal and the ring-shaped third metal are disposed to face each other to form a first capacitor, the disk-shaped second metal and the disk-shaped fourth metal are disposed to face each other to form a second capacitor, and
each center of gravity of the ring-shaped first metal through the disk-shaped fourth metal is aligned on a single vertical line while the disk-shaped fourth metal of each power receiver, the disk-shaped second metal of each power transmitter, the ring-shaped third metal of each power receiver, and the ring-shaped first metal of each power transmitter are arranged in that order from top to bottom, and the ring-shaped first metal through the disk-shaped fourth metal form capacitive couplings.

2. The capacitive coupler structure of claim 1, wherein each inner radius of the ring-shaped first metal and the ring-shaped third metal is larger than each radius of the disk-shaped second metal and the disk-shaped fourth metal.

3. A wireless power transfer system comprising:
a power supply;
an inverter;
a compensation circuit;
a capacitive coupler structure;
a rectifier; and
a resistor,
wherein the capacitive coupler structure includes:
power transmitters each including a ring-shaped first metal and a disk-shaped second metal; and
power receivers each including a ring-shaped third metal and a disk-shaped fourth metal,
wherein the ring-shaped first metal and the ring-shaped third metal are disposed to face each other to form a first capacitor, the disk-shaped second metal and the disk-shaped fourth metal are disposed to face each other to form a second capacitor, and
each center of gravity of the ring-shaped first metal through the disk-shaped fourth metal is aligned on a single vertical line while the disk-shaped fourth metal of each power receiver, the disk-shaped second metal of each power transmitter, the ring-shaped third metal of each power receiver, and the ring-shaped first metal of each power transmitter are arranged in that order from top to bottom, and the ring-shaped first metal through the disk-shaped fourth metal form capacitive couplings.

4. The wireless power transfer system of claim 3, wherein each inner radius of the ring-shaped first metal and the ring-shaped third metal is larger than each radius of the disk-shaped second metal and the disk-shaped fourth metal.

* * * * *